United States Patent
Andreyo et al.

(10) Patent No.: US 12,124,059 B1
(45) Date of Patent: Oct. 22, 2024

(54) COLLIMATED BEAM ALIGNMENT SYSTEM FOR ELECTRIC POWER DISCONNECT SWITCH

(71) Applicant: Southern States LLC, Hampton, GA (US)

(72) Inventors: Joseph Andreyo, Fayetteville, GA (US); Juan Camilo Gill-Gaviria, Alpharetta, GA (US); Joseph R Rostron, McDonough, GA (US)

(73) Assignee: SOUTHERN STATES, LLC, Hampton, GA (US)

( * ) Notice: Subject to any disclaimer, the term of this patent is extended or adjusted under 35 U.S.C. 154(b) by 0 days.

(21) Appl. No.: 18/498,264

(22) Filed: Oct. 31, 2023

(51) Int. Cl.
  *G02B 5/00* (2006.01)
  *G01B 11/26* (2006.01)
  *H01H 9/02* (2006.01)

(52) U.S. Cl.
  CPC .............. *G02B 5/005* (2013.01); *G01B 11/26* (2013.01); *H01H 9/02* (2013.01)

(58) Field of Classification Search
  CPC ........... G02B 5/005; G01B 11/26; H01H 9/02
  USPC ....................................................... 356/309
  See application file for complete search history.

(56) References Cited

U.S. PATENT DOCUMENTS

| | | | |
|---|---|---|---|
| 8,209,874 B1 * | 7/2012 | Tribble | G01C 15/06 33/286 |
| 2010/0025209 A1 * | 2/2010 | Rister | H01H 1/0015 200/308 |

FOREIGN PATENT DOCUMENTS

| | | |
|---|---|---|
| BR | 102013020198 A2 | 10/2015 |
| CN | 106409593 A | 2/2015 |
| CN | 206363938 U | 7/2017 |
| CN | 109586193 A | 1/2020 |
| CN | 10072319 U | 2/2020 |
| CN | 108801141 B | 7/2020 |
| CN | 211576030 U | 9/2020 |
| CN | 112038133 A | 12/2020 |
| CN | 109406991 B | 5/2021 |
| CN | 113096985 A | 7/2021 |

(Continued)

OTHER PUBLICATIONS

Wang Bozhong, Review on Breaking-closing Position Monitoring Method for Intelligent Disconnecting Switches, Jan. 2019.

(Continued)

*Primary Examiner* — Sunghee Y Gray
(74) *Attorney, Agent, or Firm* — MEHRMAN LAW OFFICE; Michael Mehrman

(57) ABSTRACT

A collimated beam alignment system for aligning a receiving insulator, a guide insulator and a drive insulator of an electric power disconnect switch. The collimated beam alignment system includes an emitter stage temporarily attached to the receiving insulator, an aperture stage including an alignment aperture temporarily attached to the receiving insulator, and a target stage including an alignment target temporarily attached to the drive insulator. With the drive insulator rotated to a switch-closed position, proper alignment of the receiving insulator, the guide insulator and the drive insulator is indicated by a visible spectrum collimated beam from the emitter stage passing through the alignment aperture and illuminating the alignment target. Once the insulators are aligned, the alignment system is removed and the live components of the disconnect switch are attaches to the insulators.

12 Claims, 15 Drawing Sheets

(56) References Cited

FOREIGN PATENT DOCUMENTS

CN 113327807 A 8/2021

OTHER PUBLICATIONS

Jing Huang, An Online Measurement Method for Insulator Creepage Distance on Transmission Lines, Jul. 6, 2018.

* cited by examiner

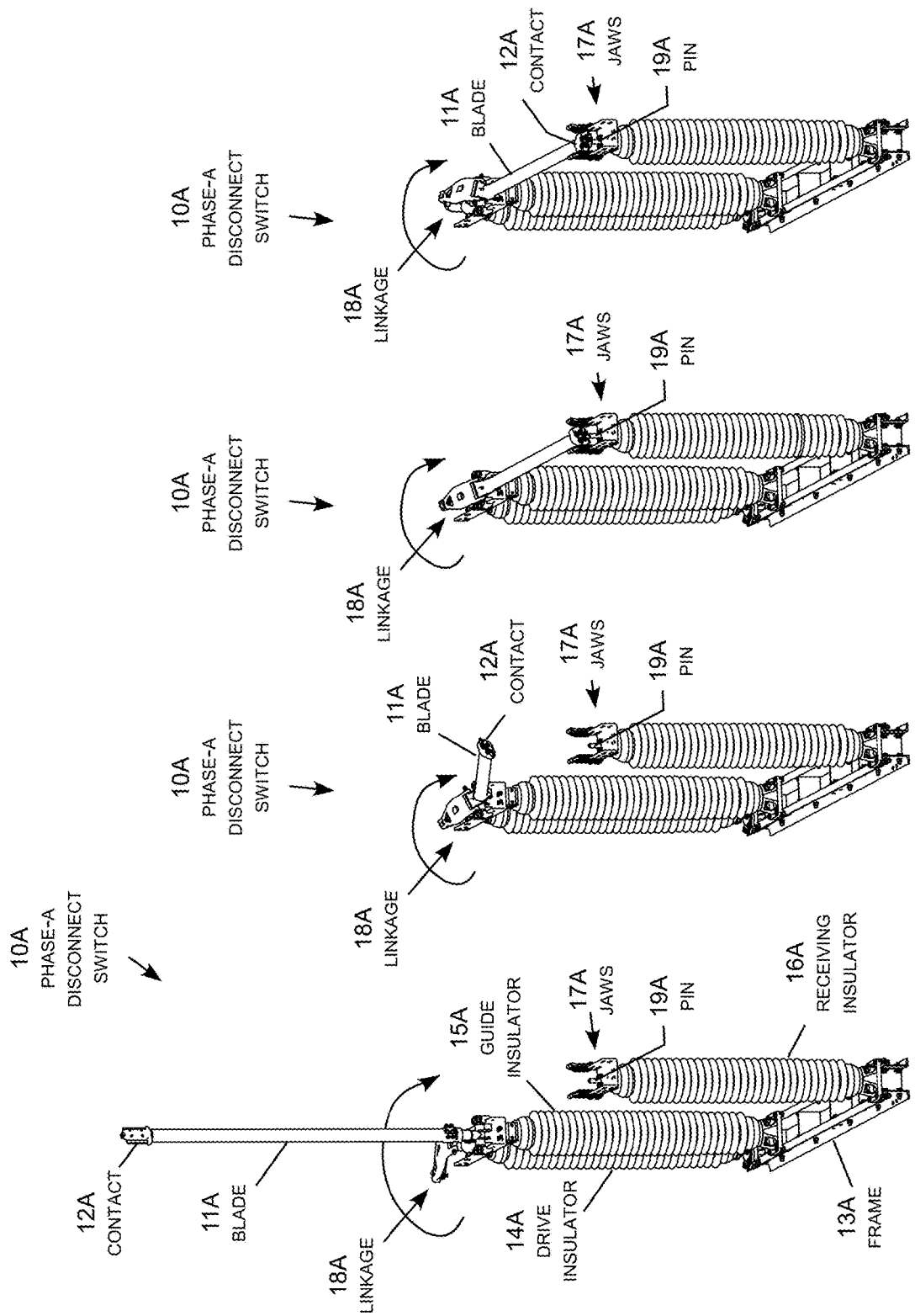

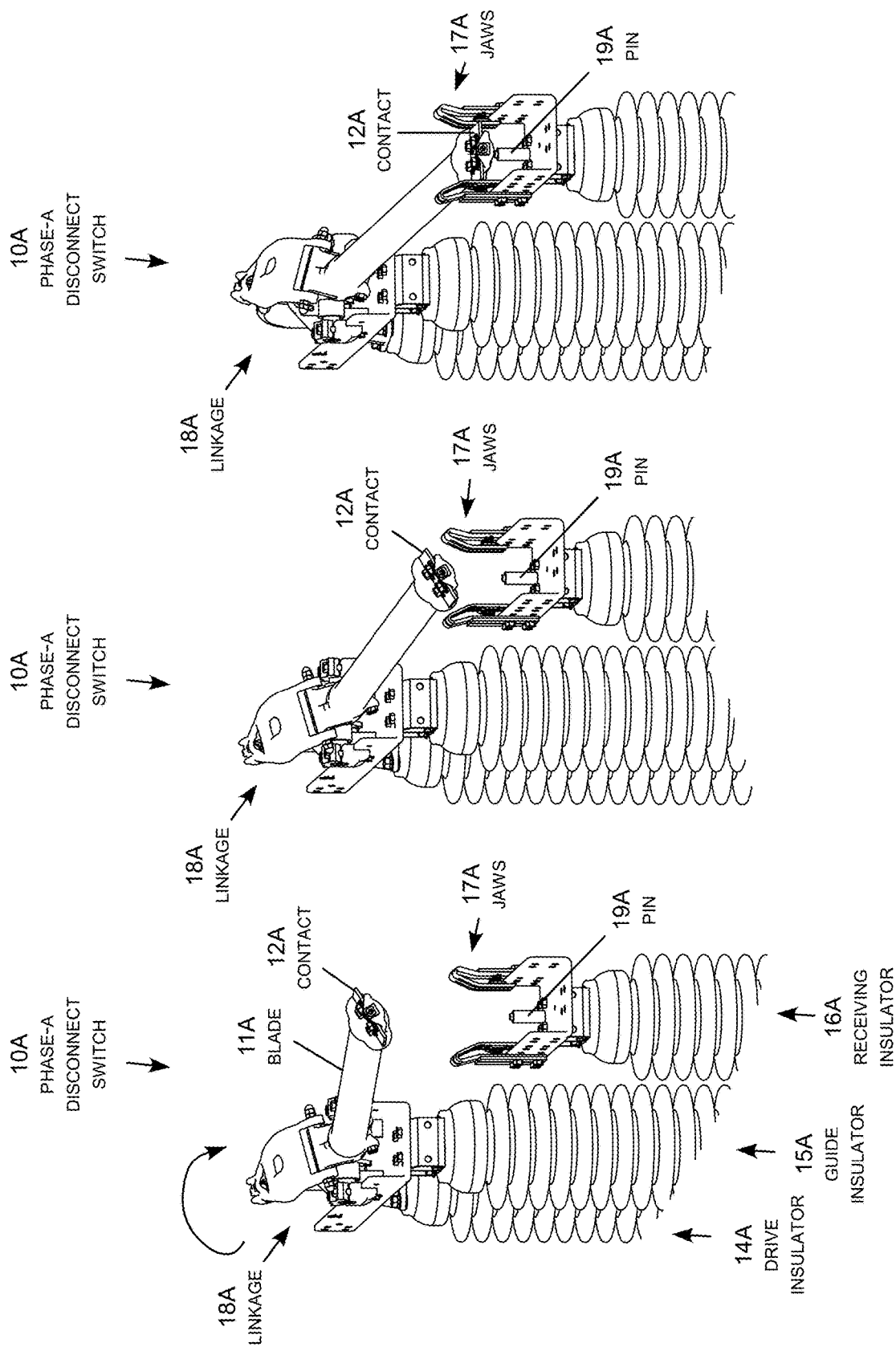

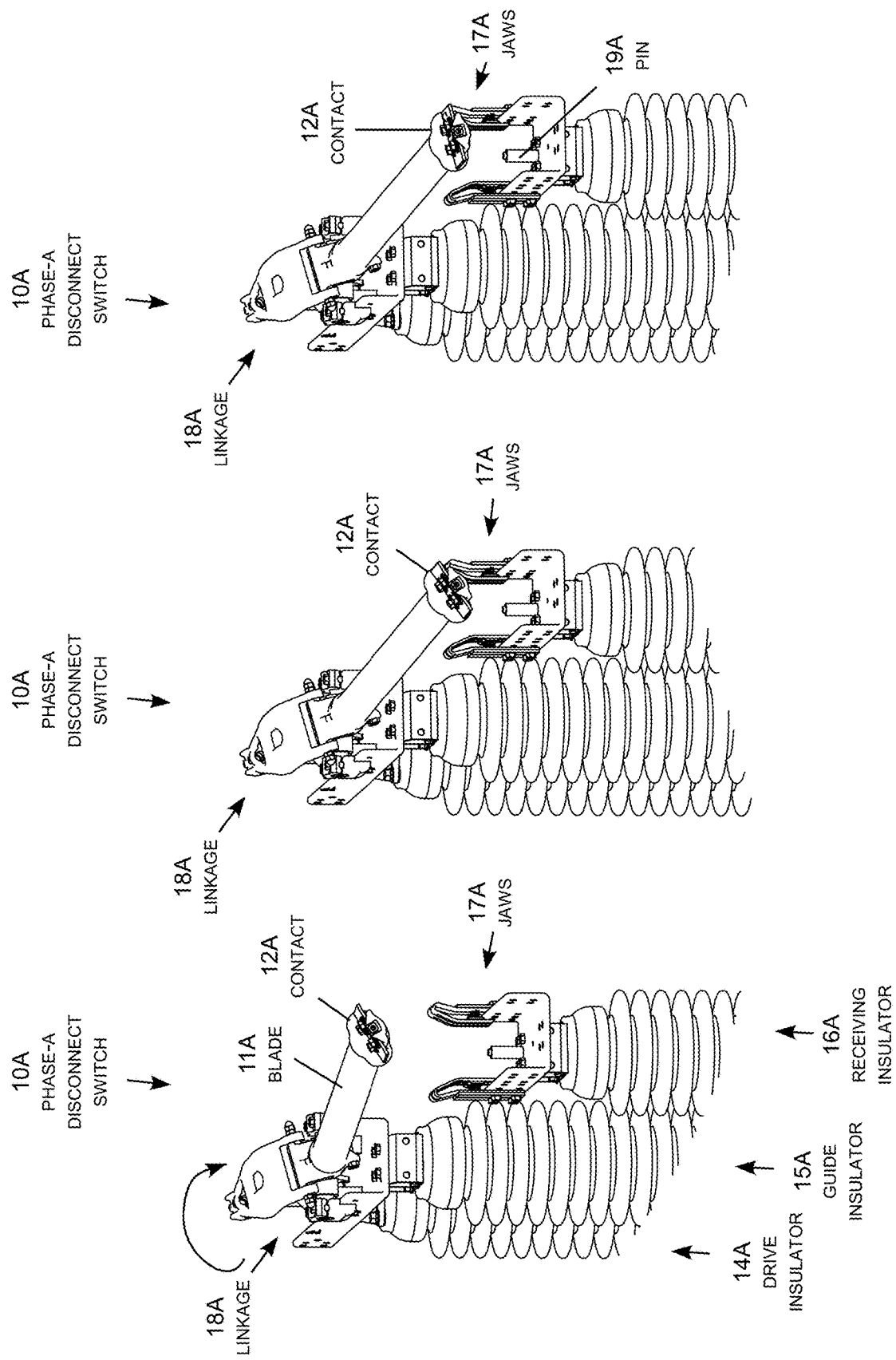

COLLIMATED BEAM ALIGNMENT SYSTEM FOR ELECTRIC POWER DISCONNECT SWITCH

TECHNICAL FIELD

The present invention is directed to electric power systems and, more particularly, to systems for aligning the insulators of blade-type electric power disconnect switches.

BACKGROUND OF THE INVENTION

Blade-type electric power disconnect switches, also known as vertical break disconnect switches, have been in in use for decades. In a conventional blade-type disconnect switch, an elongated blade rotates about its longitudinal axis while it pivots between a vertical switch-open position and a horizontal switch-closed position. The motion of the blade is driven by rotation of a drive insulator while a linkage attached across the tops of the drive insulator and a guide insulator rotates and pivots the blade between the switch-open and switch-closed positions in response to rotation of the drive insulator. In the switch-closed position, a contact on the end of the blade comes into physical and electrical contact with a jaws on top of a receiving insulator. The rotation of the blade about its longitudinal axis causes the contact to force the jaws slightly apart and properly seat in contact with a pin forming a secure electrical connection between the contact and the jaws. Any misalignment of the insulators can prevent the contact from properly seating in the jaws, resulting in a loose connection and potentially damaging arcing between the jaws and the contact. Conventional approaches to insulator alignment rely on repetitive manual adjustment, which is difficult and time consuming. A need therefore exists for improved techniques for aligning the insulators of blade-type disconnect switches.

SUMMARY THE INVENTION

The invention may be embodied in a collimated beam alignment system for aligning a first insulator, a second insulator, and a third insulator of an electric power disconnect switch. The alignment system includes an emitter stage temporarily attached to the first insulator, an aperture stage temporarily attached to the second insulator including an alignment aperture, and a target stage temporarily attached to the third insulator including an alignment target. With one of the insulators rotated to a switch-closed position, proper alignment of the insulators is indicated by a visible spectrum collimated beam from the emitter stage passing through the alignment aperture and illuminating the alignment target. The visible spectrum collimated beam may be a laser beam, a collimated LED beam, or other suitable type of visible spectrum collimated beam.

In a representative embodiment, the first insulator is a receiving insulator, the second insulator is a guide insulator, and the third insulator is a drive insulator. The emitter stage includes a number of studs sized and positioned to fit into respective bolt holes on a top side of the receiving insulator. These bolt holes are configured to receive bolts for attaching a jaws of the electric power disconnect switch to the top side of the receiving insulator after the emitter stage has been removed. The emitter stage also includes a base plate with a number of direction adjustment slots for selectively altering positioning of the studs on the base plate to alter the orientation of the emitter stage with respect to the receiving insulator.

Like the emitter stage, the aperture stage includes a number of studs sized and positioned to fit into respective bolt holes on a top side of the guide insulator. The bolt holes are configured to receive bolts for attaching a linkage of the electric power disconnect switch to the top side of the guide insulator after the aperture stage has been removed. The aperture stage also includes a base plate including a number of direction adjustment slots for selectively altering positioning of the studs on the base plate to alter the orientation of the aperture stage with respect to the guide insulator.

Similarly, the target stage includes a number of studs sized and positioned to fit into respective bolt holes on a top side of the drive insulator. The bolt holes are configured to receive bolts for attaching a linkage of the electric power disconnect switch to the top side of the drive insulator after the target stage has been removed. The target stage also includes a base plate including a number of direction adjustment slots for selectively altering positioning of the studs on the base plate to alter the orientation of the target stage with respect to the receiving insulator.

The target stage may include a dumbbell shaped beam finder including upper and lower lobes with the alignment target positioned on a recessed connecter between the upper and lower lobes. The emitter stage, aperture stage and target stage may be temporarily attached to the receiving insulator by one or more magnets, such as magnetic studs that fit into the bolt holes in the top sides of the insulators. The base plate of each stage may be an instance of a universal magnetic bracket.

It will be understood that specific embodiments may include a variety of features in different combinations, as desired by different users. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which:

FIGS. 1A-1D are perspective views of an electric power disconnect switch.

FIGS. 2A-2C provide enlarged views of the disconnect switch illustrating proper seating of a contact.

FIGS. 3A-3C provide enlarged views of the disconnect switch illustrating improper seating of the contact.

DETAILED DESCRIPTION

Figure 4A:
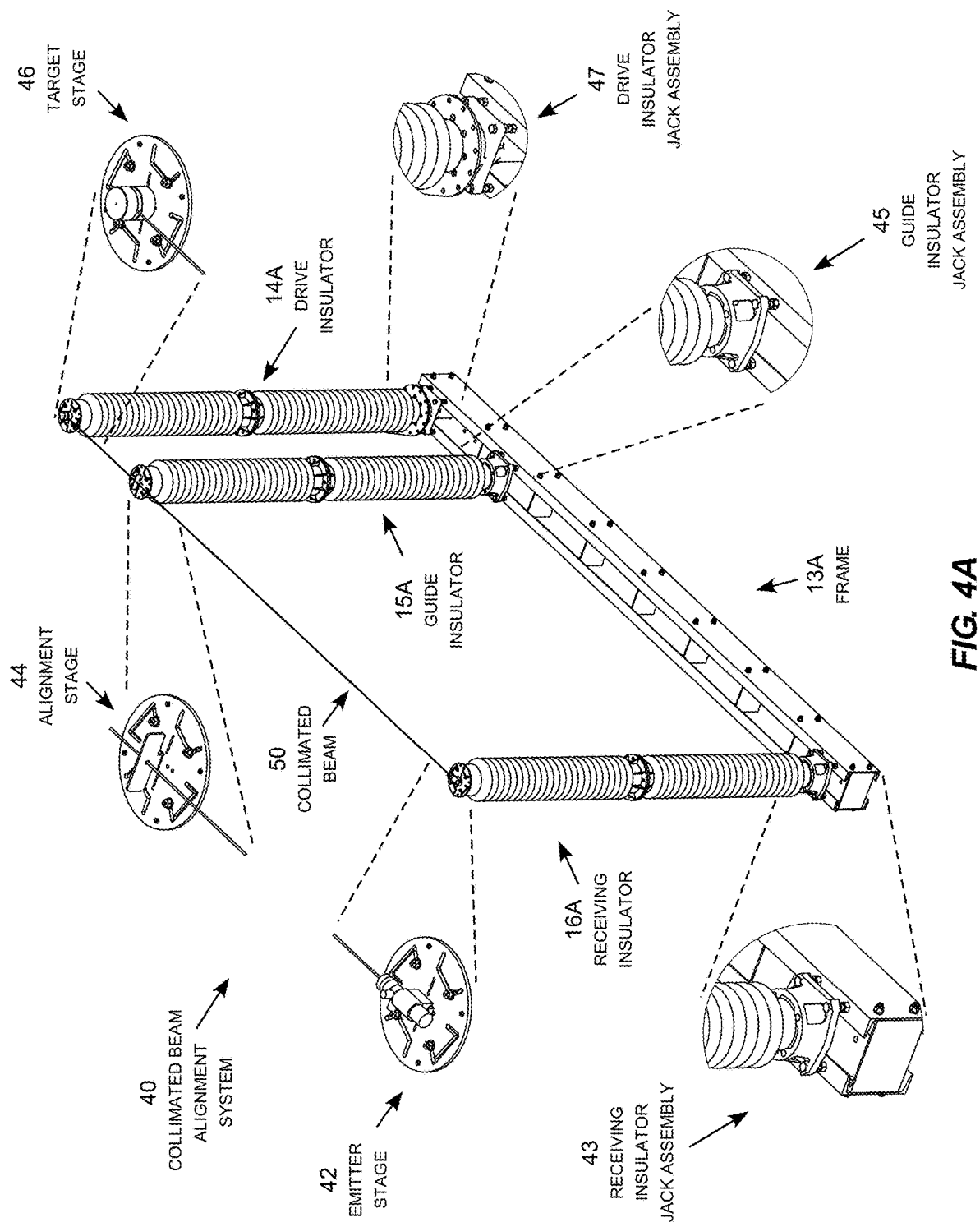
FIG. 4A is a perspective illustration of a collimated beam alignment system for aligning the insulators of the disconnect switch.

The invention may be embodied in a collimated beam alignment system for aligning the insulators of a blade-type electric power disconnect switch. Although these switches are often referred to as vertical break disconnect switches, they may be positioned in any orientation. The collimated beam alignment system includes an emitter stage, an aperture stage, and a target stage that temporarily attach to the tops of the insulators of the disconnect switch. Generally described, the emitter stage is temporarily attached to the top side of a first insulator, the aperture stage is temporarily attached to the top side of a second insulator, and the target stage is temporarily attached to the top side of a third insulator of the disconnect switch. In the representative embodiment illustrated in the figures, the emitter stage is temporarily attached to the top side of the receiving insulator, the aperture stage is temporarily attached to the top side of the guide insulator, and the target stage is temporarily attached to the top side of the receiving insulator of the disconnect switch.

In this embodiment, the live components of the disconnect switch include a jaws supported by the receiving insulator and a linkage supporting the pivoting end of a blade supported by the guide and drive insulators. The elongated blade rotates about its longitudinal axis while it pivots between a vertical switch-open position and a horizontal switch-closed position. The motion of the blade is driven by rotation of the drive insulator while the linkage attached across the tops of the drive insulator and the guide insulator rotates and pivots the blade between the switch-open and switch-closed positions in response to rotation of the drive insulator. In the switch-closed position, a contact on the end of the blade comes into physical and electrical contact with a jaws on top of a receiving insulator. The rotation of the blade about its longitudinal axis causes the contact to force the jaws slightly apart and come into contact with a pin forming a secure electrical connection between the contact and the jaws. Any misalignment of the insulators can prevent the contact from properly seating in the jaws, resulting in a loose connection and potentially damaging arcing between the jaws and the contact. The collimated beam alignment system is used to align the insulator to ensure proper seating of the contact in the jaws to prevent this type of damage from occurring.

The alignment system is temporarily attached to the insulators before installation of the live components of the disconnect switch. With the drive insulator rotated to its switch-closed position (i.e. against the closed position stop), proper alignment of the insulators is indicated by a visual spectrum collimated beam emitted by the emitter stage passing through an alignment aperture of the aperture stage and illuminating an alignment target of the target stage. After insulator alignment, the alignment system is removed and the live components of the disconnect switch are connected to the insulators in the same locations where the emitter, aperture and target stages had previously been connected.

The emitter, aperture and target stages may be temporarily connected to their respective insulators by one or more magnets, such as magnetic studs that fit into the screw holes on the tops of the insulators used to bolt the live components of the disconnect switch to the insulators. To aid in insulator alignment, the target stage may include dumbbell shaped beam finder including upper and lower lobes with the alignment target positioned on a recessed connecter between the upper and lower lobes. The base plates of the emitter, aperture, and target stages may be instances of a universal magnetic bracket with direction adjustment slots that allow the bracket to be pointed in a variety of orientations with respect to the bolt holes in the top side of the receiving insulator.

The collimated beam may be a laser beam, a collimated light-emitting diode (LED) beam, or other suitable type of visual spectrum collimated beam with sufficiently low divergence to pass through the alignment aperture and sufficiently illuminate the alignment target in view of the intended use and physical dimensions of the disconnect switch. Inexpensive laser emitters suitable for this purpose have been commercially available for some years. More recently, suitable collimated LED devices have become available and other types of collimated beam emitters may become available in the future.

In the representative embodiment, the emitter stage is temporarily attached to the top of the receiving insulator, the aperture plate is temporarily attached to the top of the guide insulator, and the target stage is temporarily attached to the top of the guide insulator, with the guide insulator located between the drive insulator and the receiving insulator. In an alternative embodiment, the drive insulator may be located between the guide insulator and the receiving insulator. In another design alternative, the positions of the emitter stage and the target stage may be switched, with the emitter stage temporarily attached to the top side of the receiving insulator, and the target stage temporarily attached to the top side of the drive insulator. In each configuration, the aperture stage may be located between the emitter stage and the target stage.

FIGS. 1A-1D is perspective view of a blade-type electric power disconnect switch 10A for a representative phase of a three-phase power line. The switch 10A includes a conductive blade 11A with an electric contact 12A attached to a swinging end of the blade. This example is a "vertical break" configuration in which the blade 11A pivots between a vertical switch-open position shown in FIG. 1A and a horizontal, switch-closed-position shown in FIG. 1D. Although the vertical break configuration is illustrated for descriptive convenience, the switch may be positioned in any desired orientation. A frame 13A supports lower (electric ground) ends of a drive insulator 14A, a guide insulator 15A, and a receiving insulator 16A. The upper (line voltage) end of the receiving insulator 16A supports a jaws 17A, while a linkage 18A connected across the upper ends of the drive insulator 14A and the guide insulator 15A supports a pivoting end of the blade 11A. An actuator (not shown) rotates the drive insulator 14A to pivot the blade 11A between the vertical, switch-open position shown in FIG. 1A and the horizontal, switch-closed position shown n FIG. 1D. In the switch-closed position, the contact 12A becomes seated in the jaws 17A to create a secure electric contact. In addition to pivoting, the blade 11A also rotates about its longitudinal axis to cause the contact 12A to become properly seated in the jaws 17A. The rotation of the of the blade 11A about its longitudinal axis causes the contact 12A to force the jaws 17A slightly apart and come into contact with a pin 19A forming a secure electrical contact within the jaws. If the contact 12A fails to become properly seated in the jaws 17A, arcing can occur damaging the switch and causing electric disturbances on the power line.

FIGS. 2A-2C provide enlarged views of the disconnect switch 10A illustrating proper seating of the contact 12A in the jaws 17A. The contact 12A is sized to span across the jaws 17A to make secure electrical contact with the jaws and a pin 19A. The contact 12A is tilted as it enters the jaws 17A, and then rotates to horizontal once located between the jaws. The drive insulator 14A, guide insulator 15A and receiving insulator 16A are aligned to cause the contact 12A to pivot to span across the jaws 17A, while also coming into contact with the pin 19A, to create a secure electrical connection as the drive insulator 14A reaches its fully rotated position.

Figure 4B:
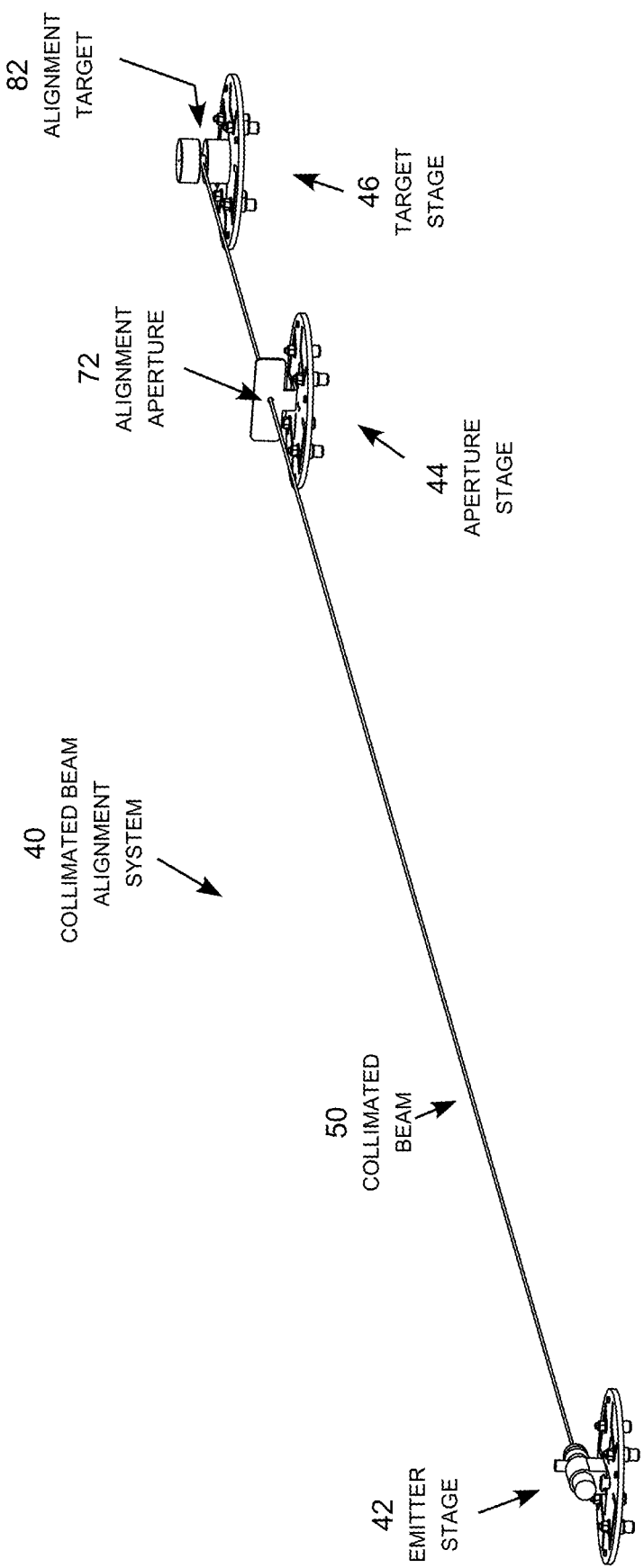
FIG. 4B is a perspective view illustrating the collimated beam alignment system indicating proper alignment of the insulators of the disconnect switch.

FIGS. 3A-3C provide enlarged views of the disconnect switch illustrating improper seating of the contact 12A due to misalignment of the insulators 14A, 15A and 16A. As shown in FIG. 3C the contact 12A becomes hung up on one side of the jaws 17A failing to come into contact with the pin 19A resulting in a potentially damaging lose connection. F FIG. 4A is a perspective illustration of a collimated beam alignment system 40 for aligning the insulators 14A, 15A and 16A prior to installing the jaws, linkage and blade on the insulators. FIG. 4B shows the collimated beam alignment system 40 indicating proper alignment of the insulators of the disconnect switch. FIGS. 3A-3C therefore illustrate the disconnect switch prior to alignment of the insulators, while FIGS. 2A-2C illustrate the disconnect switch after alignment of the insulators with the collimated beam alignment system 40 shown in FIGS. 4A-4B.

The collimated beam alignment system 40 includes an emitter stage 42, an aperture stage 44 and a target stage 46. The emitter stage 42 is temporarily attached to the top side of the receiving insulator 16A, while a receiving insulator jack assembly 43 securing the bottom of the receiving insulator to the frame 13A allows fine adjustment of the tilt of the receiving insulator. The aperture stage 44 is temporarily attached to the top side of the guide insulator 15A, while a guide insulator jack assembly 45 securing the bottom of the guide insulator to the frame 13A allows fine adjustment of the tilt of the guide insulator. In addition, the target stage 46 is temporarily attached to the top side of the drive insulator 14A, while a drive insulator jack assembly 47 securing the bottom of the drive insulator 14A to the frame 13A allows fine adjustment of the tilt of the drive insulator. The emitter stage 42 emits a collimated beam 50 toward the aperture and target stages 44, 46. With the drive insulator fully rotated to its switch-closed position (switch-closed stop position), the insulators 14A, 15A and 16A are properly aligned when the collimated beam 50 from the emitter stage 42 passes through an alignment aperture of the aperture stage 44 and illuminates an alignment target of the target stage 46. After the insulators have been properly aligned, the alignment system 40 is removed and the live components of the disconnect switch are attached to the insulator as shown in FIGS. 1A-1D.

Figure 5:
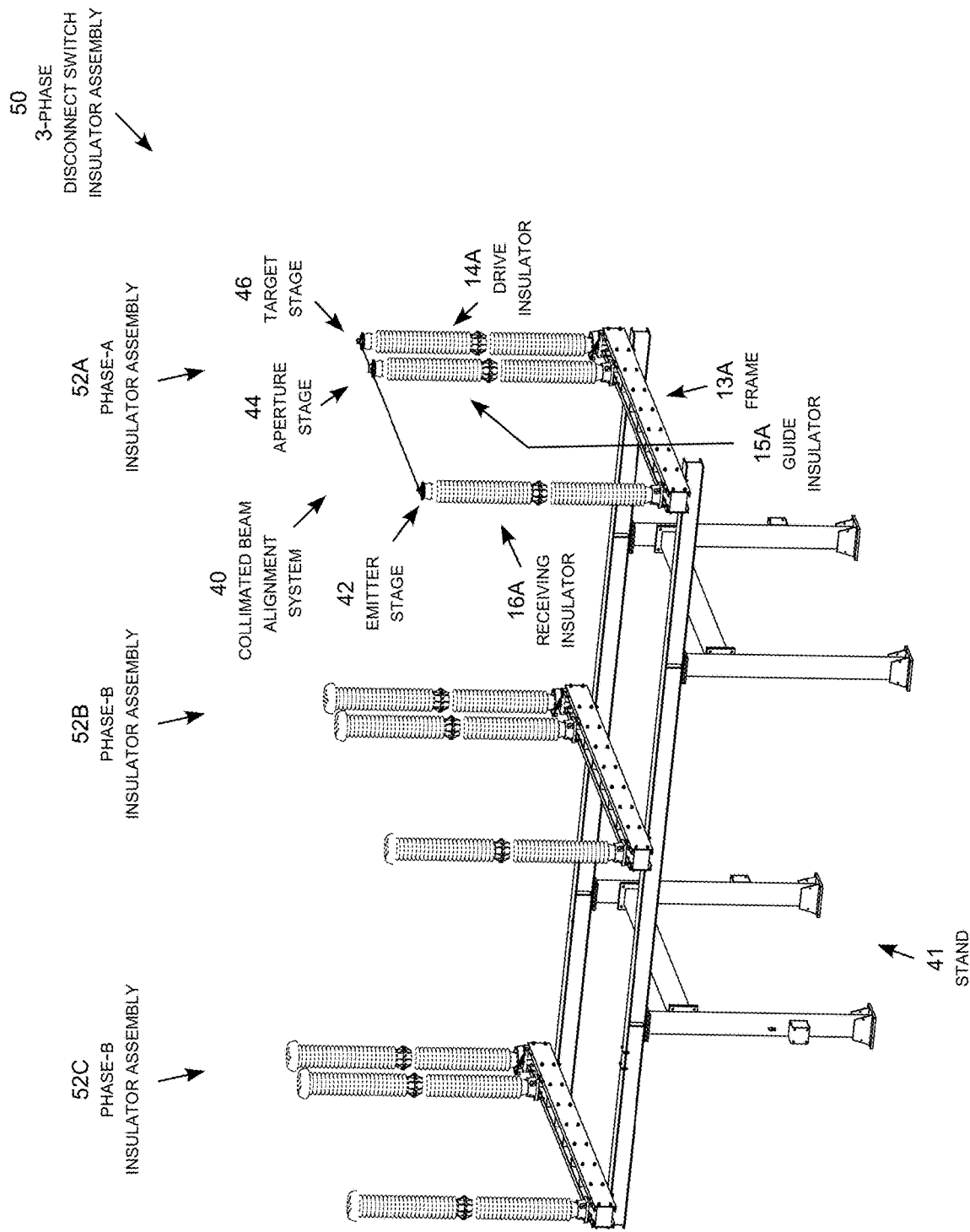
FIG. 5 is a perspective view of a three-phase disconnect switch insulator assembly.

To extend the example, FIG. 5 is a perspective view of a three-phase disconnect switch insulator assembly 50 including a phase-A insulator assembly 52A, a phase-B insulator assembly 52B, and a phase-C insulator assembly 52C. As the emitter stage 42, aperture stage 44, and target stage 46 are temporary attachments, the same collimated beam alignment system 40 can be used to separately align the insulators of each phase. Likewise, the same collimated beam alignment system 40 can be used to align the insulators of many different disconnect switches.

Figure 6:
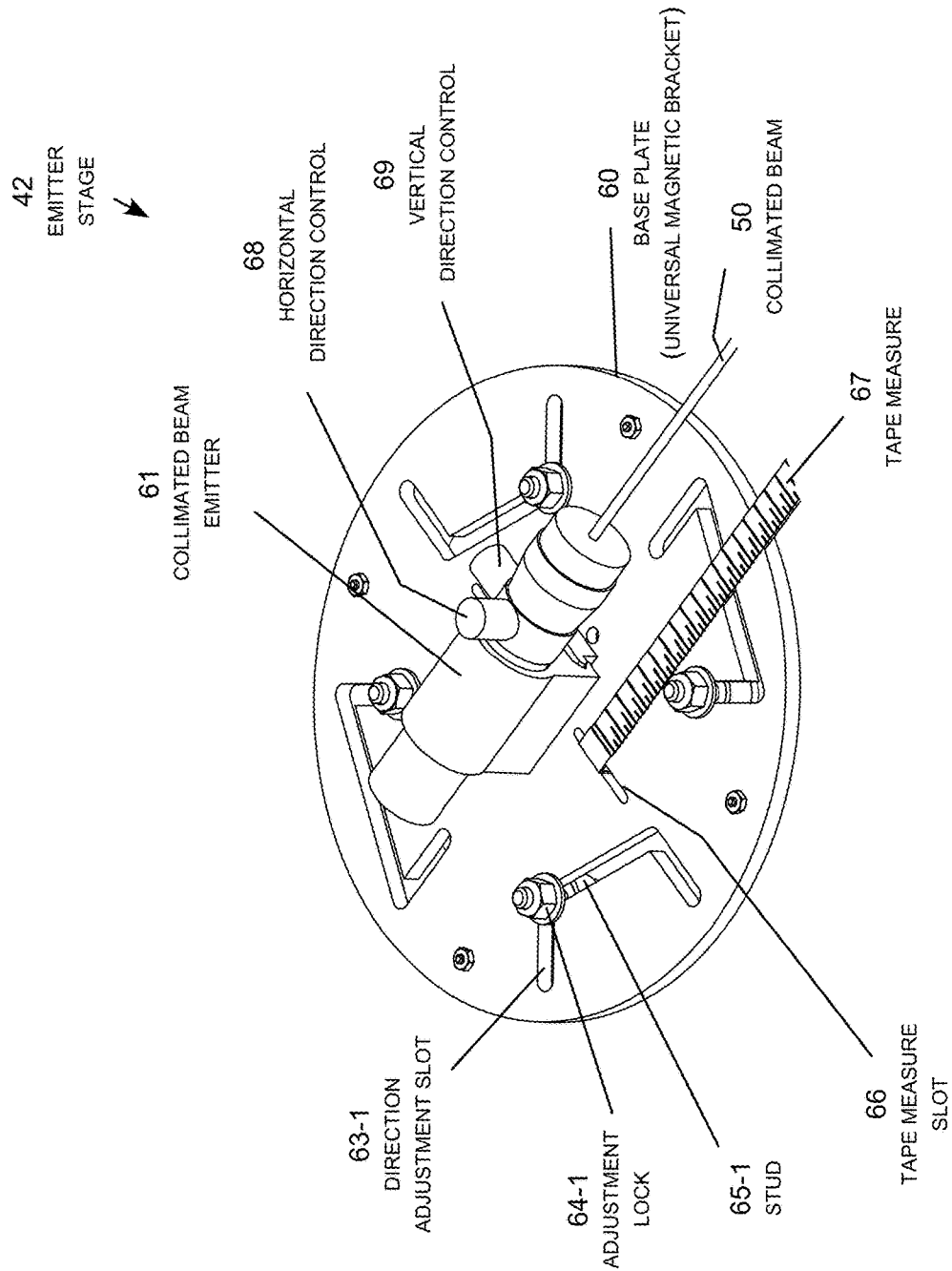
FIG. 6 is a perspective view of an emitter stage.

FIG. 6 is a perspective view of the emitter stage 42, which includes a base plate 60 supporting a collimated beam emitter 61 in fixed position on the base plate. The collimated beam emitter 61 may be removably attached to the base plate 60, for example by one or more bolts, clips or other suitable fasteners. The base plate 60 includes four directional adjustment slots represented by the enumerated directional adjustment slot 63-1. Each directional adjustment slot captures a respective adjustment lock represented by the enumerated adjustment lock 64-1 connected to a respective stud on the opposing side of the base plate 60 represented by the enumerated stud 65-1. The adjustment lock 64-1 is tightened toward a its respective stud 65-1 to capture the adjustment lock and respective stud on the base plate 60 on opposing sides of the respective direction adjustment slot 63-1. Each stud, in turn, fits into a bolt hole in the top side of the receiving insulator 16A. The studs may be magnetic to facilitate temporary magnetic attachment to the steel bold sleeves of the receiving insulator 16A. The directional adjustment slots allow the collimated beam 50 to be pointed in a variety of orientations with respect to the bolt holes in the top side of the receiving insulator. The baseplate 60 also includes a tape measure slot 66 for receiving the end of a tape measure 67 extending in the pointing direction of the collimated beam 50. The collimated beam emitter includes a horizontal direction control 68 and a vertical direction control 69 for fine adjustment of the pointing direction of the collimated beam 50.

Figure 7:
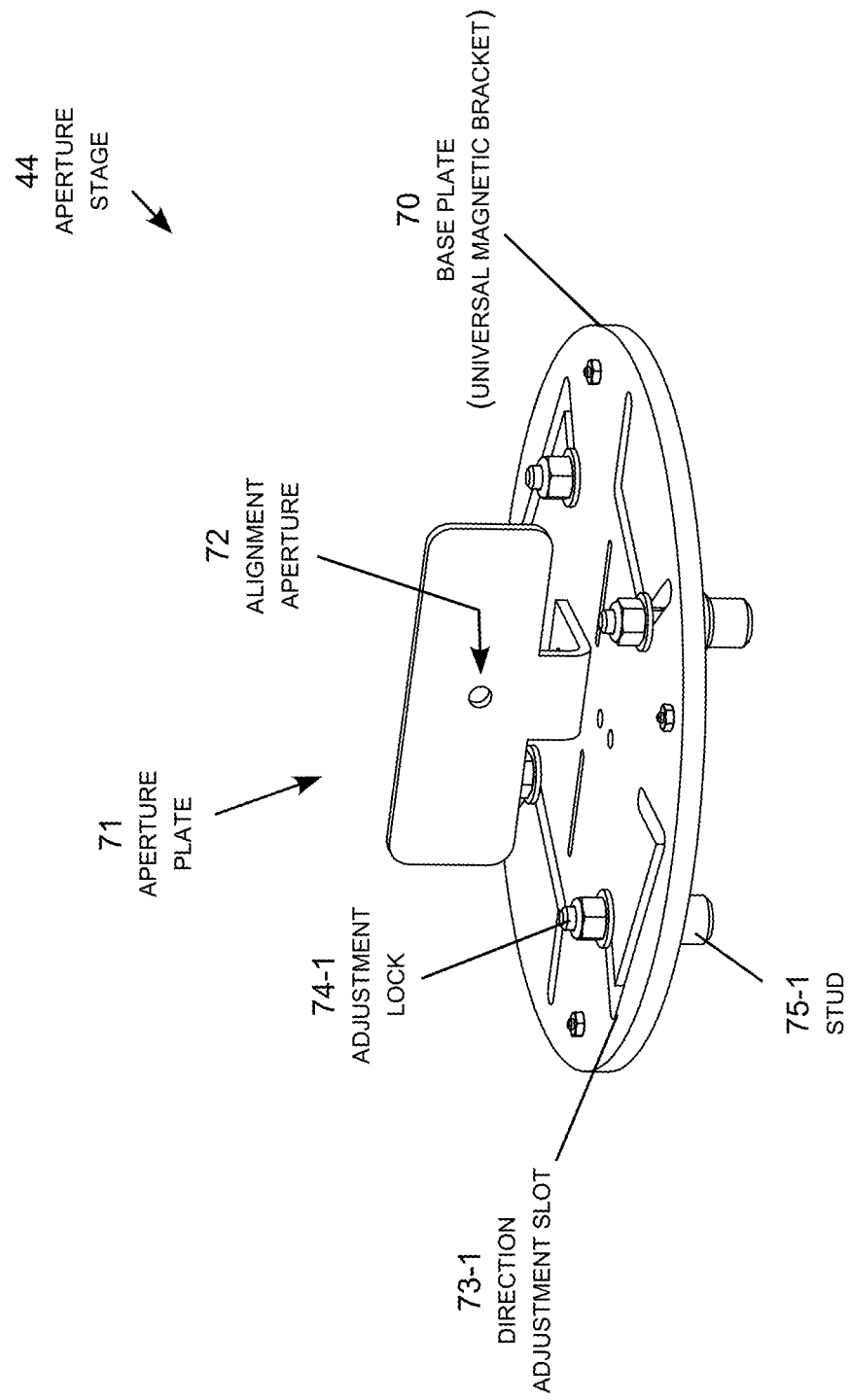
FIG. 7 is a perspective view of an aperture stage.

FIG. 7 is a perspective view of the aperture stage 44, which includes a base plate 70 supporting an aperture plate 71 with an alignment aperture 72 sized to allow the collimated beam 50 to pass through with desired tolerance. The aperture plate 71 may be removably attached to the base plate 70, for example by one or more bolts, clips or other suitable fasteners. The base plate 70 includes four directional adjustment slots represented by the enumerated directional adjustment slot 73-1. Each directional adjustment slot captures a respective adjustment lock represented by the enumerated adjustment lock 74-1 connected to a respective stud on the opposing side of the base plate 70 represented by the enumerated stud 75-1. The adjustment lock 74-1 is tightened toward a its respective stud 75-1 to capture the adjustment lock and respective stud on the base plate 70 on opposing sides of the respective direction adjustment slot 73-1. Each stud, in turn, fits into a bolt hole in the top side of the guide insulator 15A. The studs may be magnetic to facilitate temporary magnetic attachment to the steel bolt sleeves of the guide insulator 15A. The directional adjustment slots allow the aperture plate 71 to be pointed in a variety of orientations with respect to the bolt holes in the top of the receiving insulator.

Figure 8:
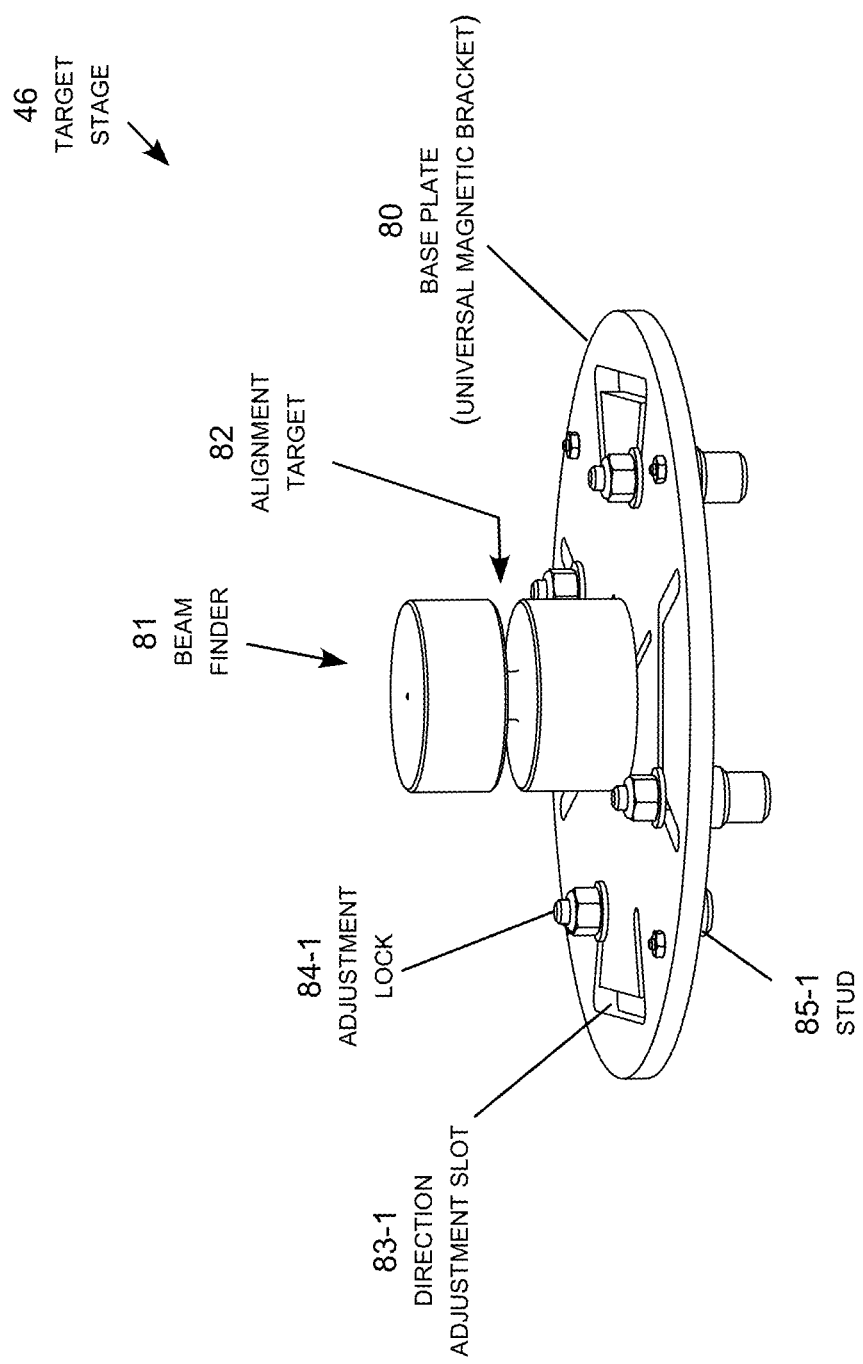
FIG. 8 is a perspective view of the target stage.

FIG. 8 is a perspective view of the target stage 48, which includes a base plate 80 supporting a dumbbell shaped beam finder 81 with a smaller central alignment target 82. The beam finder 71 may be removably attached to the base plate 80, for example by one or more bolts, clips or other suitable fasteners. The base plate 80 includes four directional adjustment slots represented by the enumerated directional adjustment slot 83-1. Each directional adjustment slot captures a respective adjustment lock represented by the enumerated adjustment lock 84-1 connected to a respective stud on the opposing side of the base plate 60 represented by the enumerated stud 85-1. The adjustment lock 84-1 is tightened toward a its respective stud 85-1 to capture the adjustment lock and respective stud on the base plate 80 on opposing sides of the respective direction adjustment slot 83-1. Each stud, in turn, fits into a bolt hole in the top of the drive insulator 14A. The studs may be magnetic to facilitate temporary magnetic attachment to the steel bold sleeves of the drive insulator 14A. The directional adjustment slots allow the collimated beam target 81 to be pointed in a variety of orientations with respect to the bolt holes in the top of the receiving insulator.

The base plates 60, 70 and 80 may be instances of a universal magnetic bracket to with the emitter 61, aperture plate 71, or beam finder 81 alternatively attached. The direction adjustment slots allow the studs to be secured in different positions corresponding to different orientations relative to the positions of the bolt holes on the top of the insulator to which the universal magnetic bracket is attached.

Figure 10:
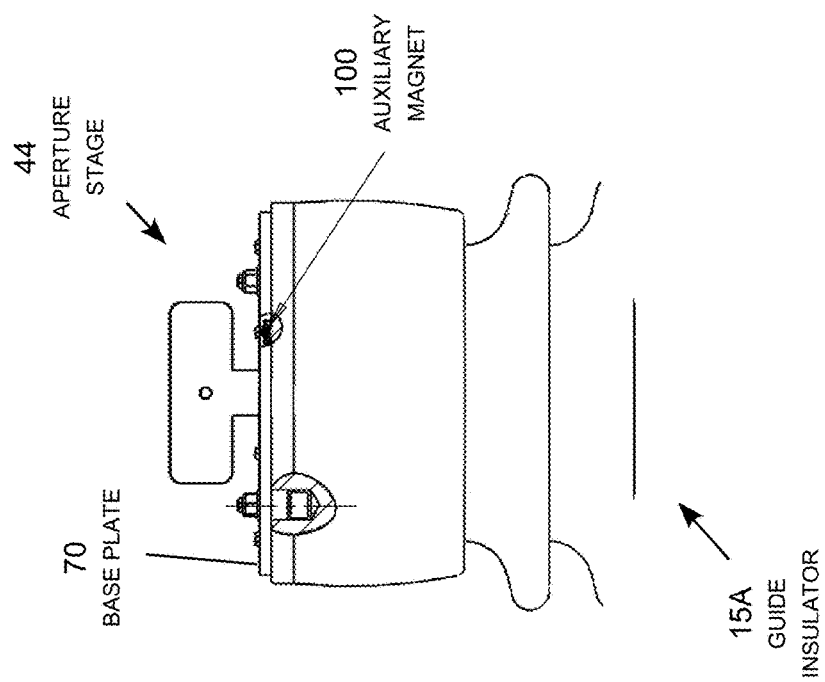
FIG. 10 is a side cutaway view of the aperture stage and guide insulator.
Figure 9:
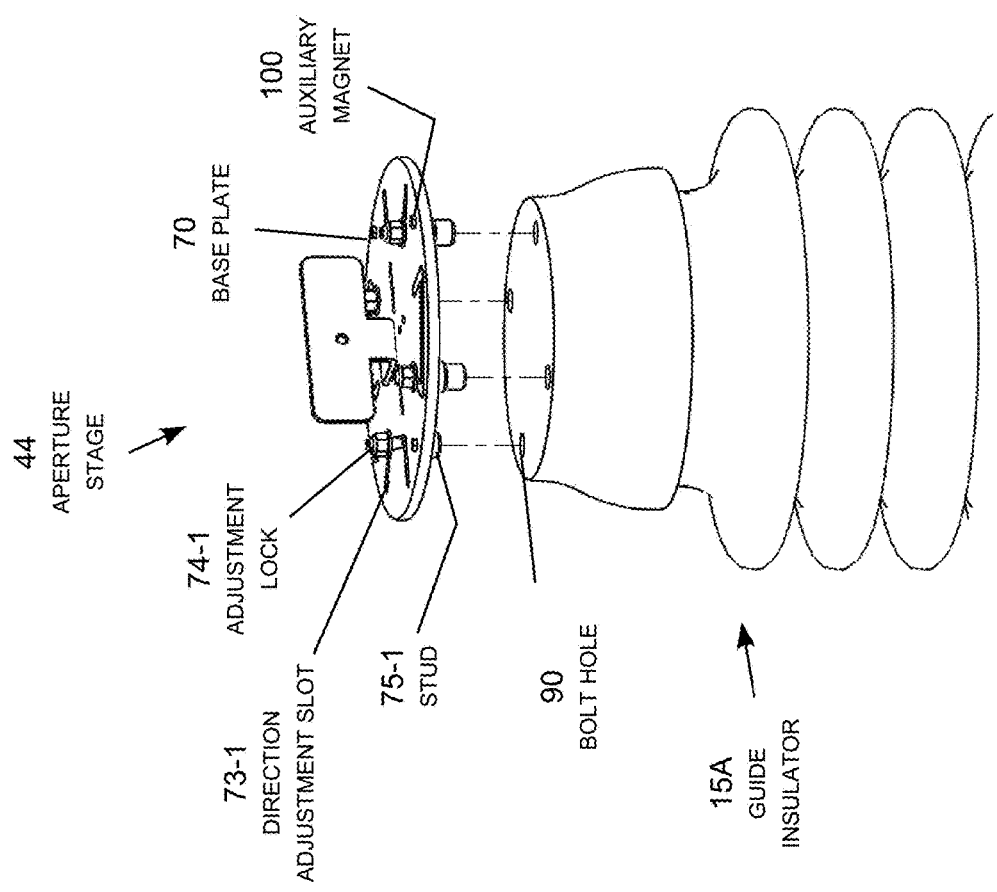
FIG. 9 is a perspective exploded view of an aperture stage and a guide insulator.

FIG. 9 is a perspective exploded view illustrating the temporary attachment of the aperture stage 44 to the guide insulator 15A. Attachment of one stage is described as representative of the stages. Likewise, one attachment point is described as representative of the four points of attachment of the aperture stage 44. The stud 75-1 is positioned in the direction adjustment slot 73-1 in the desired location The adjustment lock 74-1 is tightened onto the stud which captures the adjustment lock 74-1 and stud 75-1 in a desired location on the base plate 70. The baseplate 70 is temporarily attached to the guide insulator 15a with the stud 75-1 inserted into the bolt hole 90 on the top side of the guide insulator. In this example, there are four studs positioned within respective bolt holes on the top side of the guide insulator. The studs may be held in place by interference fit or aided by magnets in the studs attracted to the steel lugs in the bolt holes. After the insulators have been aligned and the aperture stage 44 removed, the same bolt holes are used to attach the linkage 18A to the guide insulator (see FIGS. 2A-2C). FIG. 10 is a side cutaway view of the aperture stage and guide insulator illustrating the use of auxiliary magnets represented by the enumerated auxiliary magnet 77 embedded in the base plate 70 to hold the aperture stage 44 in place on the receiving insulator 15A. The use of auxiliary magnets depends on the availability and locations of metallic structures on the top of the insulator. Auxiliary magnets may also avoid the need for magnetic studs.

Figure 11:
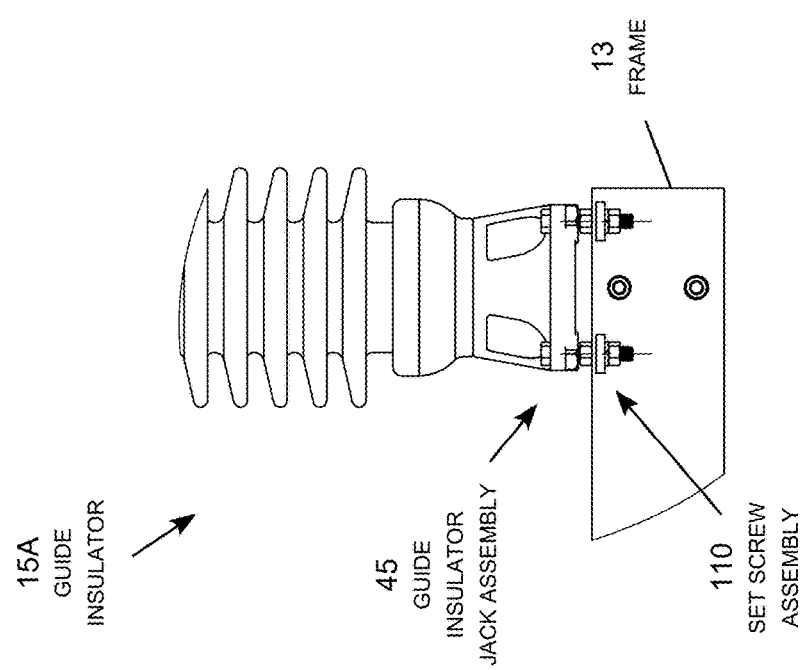
FIG. 11 is a side view of a receiving insulator jack assembly.

FIG. 11 is a side view of the receiving insulator jack assembly 45 attaching the bottom of the guide insulator 15A to the frame 13A. The guide insulator jack assembly 45 includes four set bolt assemblies represented by the enumerated set bolt assembly 110. A technician adjusts the set bolt assemblies allowing fine adjustment of the height and tilt of the guide insulator 15A above the frame 13. A similar receiving insulator jack assembly 43 attaches the bottom of the receiving insulator 16A to the frame 13A (see FIG. 4).

Figure 12:
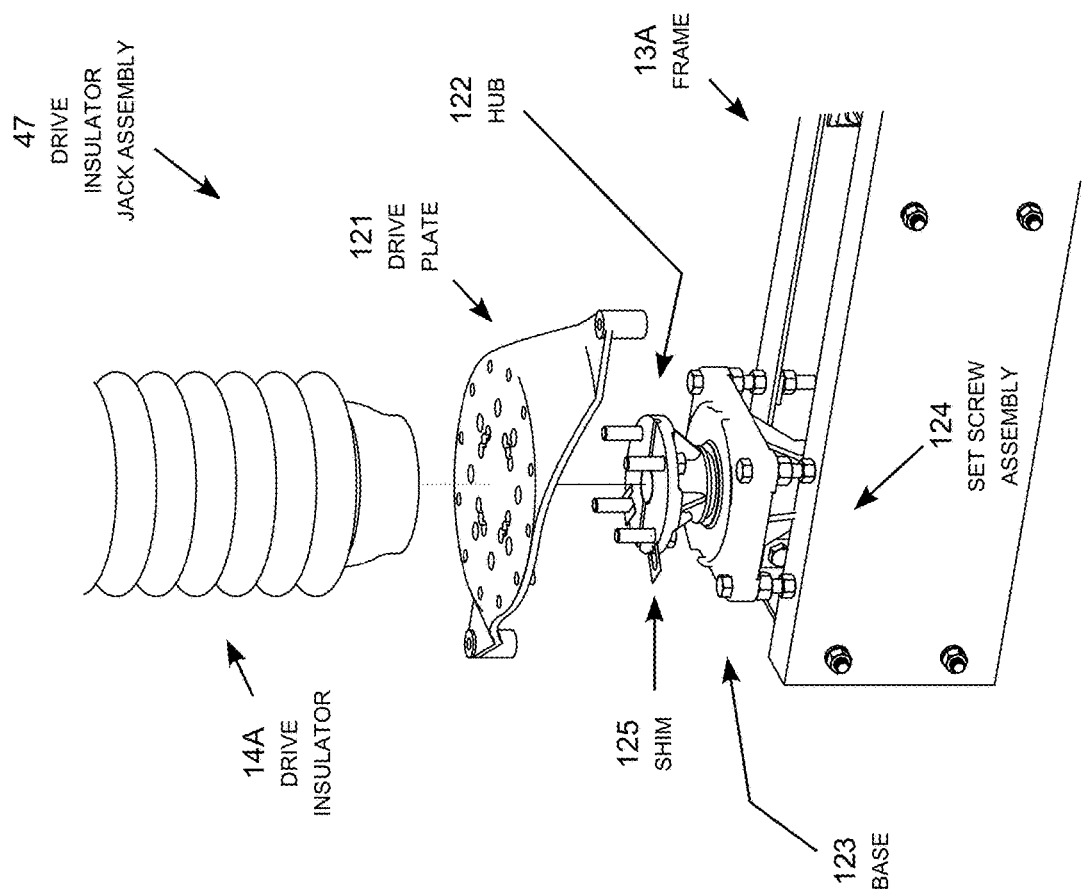
FIG. 12 is an exploded perspective view of a drive insulator jack assembly.

FIG. 12 is an exploded perspective view of the drive insulator jack assembly 47. The drive plate 121 rotates the drive insulator 14A to move the switch between the switch-open and switch-closed positions. The drive plate is mounted on a hub 122 that pivots within a base 123, which is mounted on the frame 13A by a set bolt assembly 124. The technician adjusts the set bolt assembly 124 to finely adjust the height of the drive insulator 14A above the frame 13A and the tilt of the drive insulator with respect to the frame. The technician may also install one or more shims represented by the illustrated shim 124 to further adjust the adjust the height and tilt of the drive insulator. For example, one or more shim may be installed to mitigate wobbling of the drive insulator 14A, as described with reference to FIGS. 13D-13E.

Figure 13A:
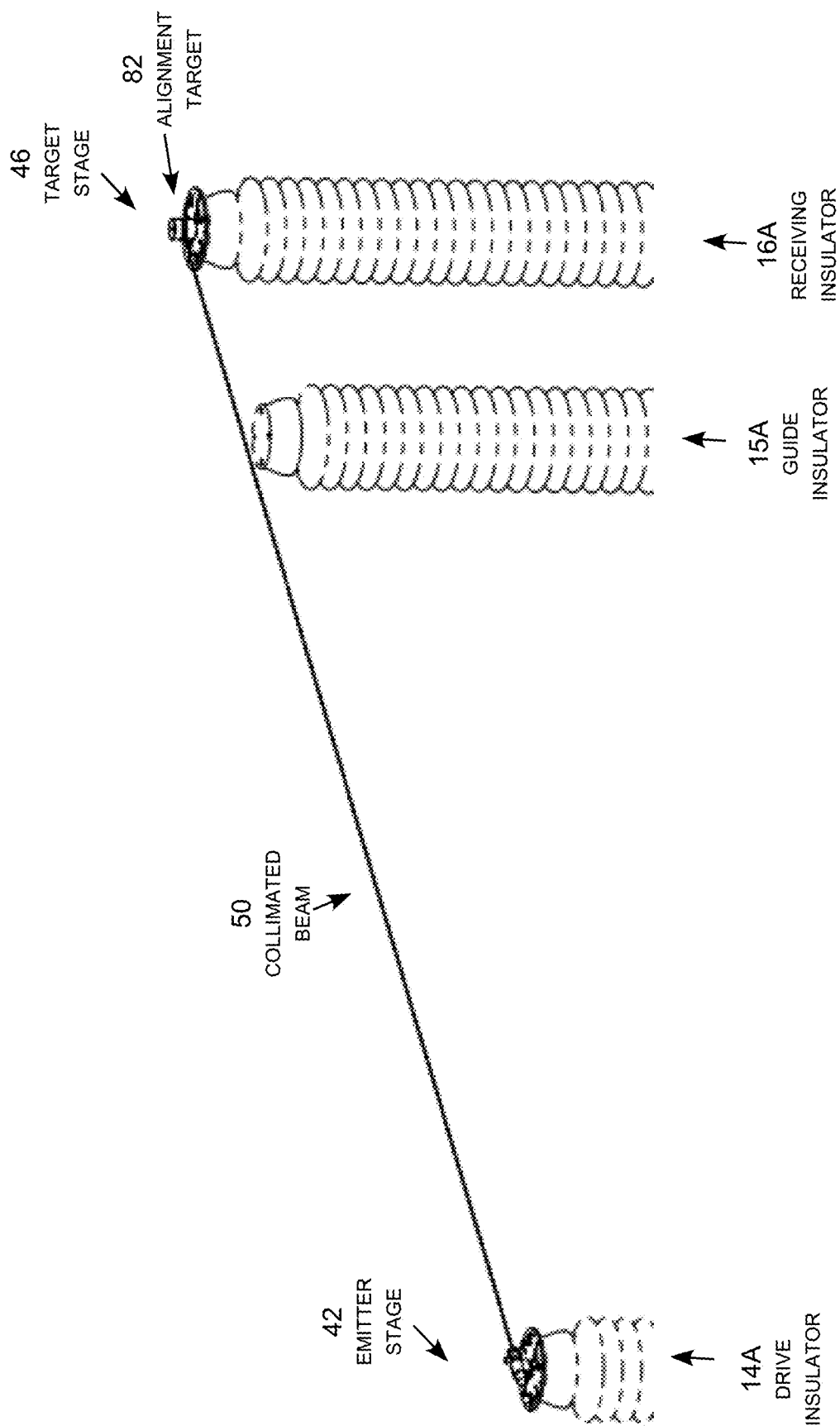
FIG. 13A-13E illustrate an insulator alignment procedure using the collimated beam alignment system.
Figure 13B:
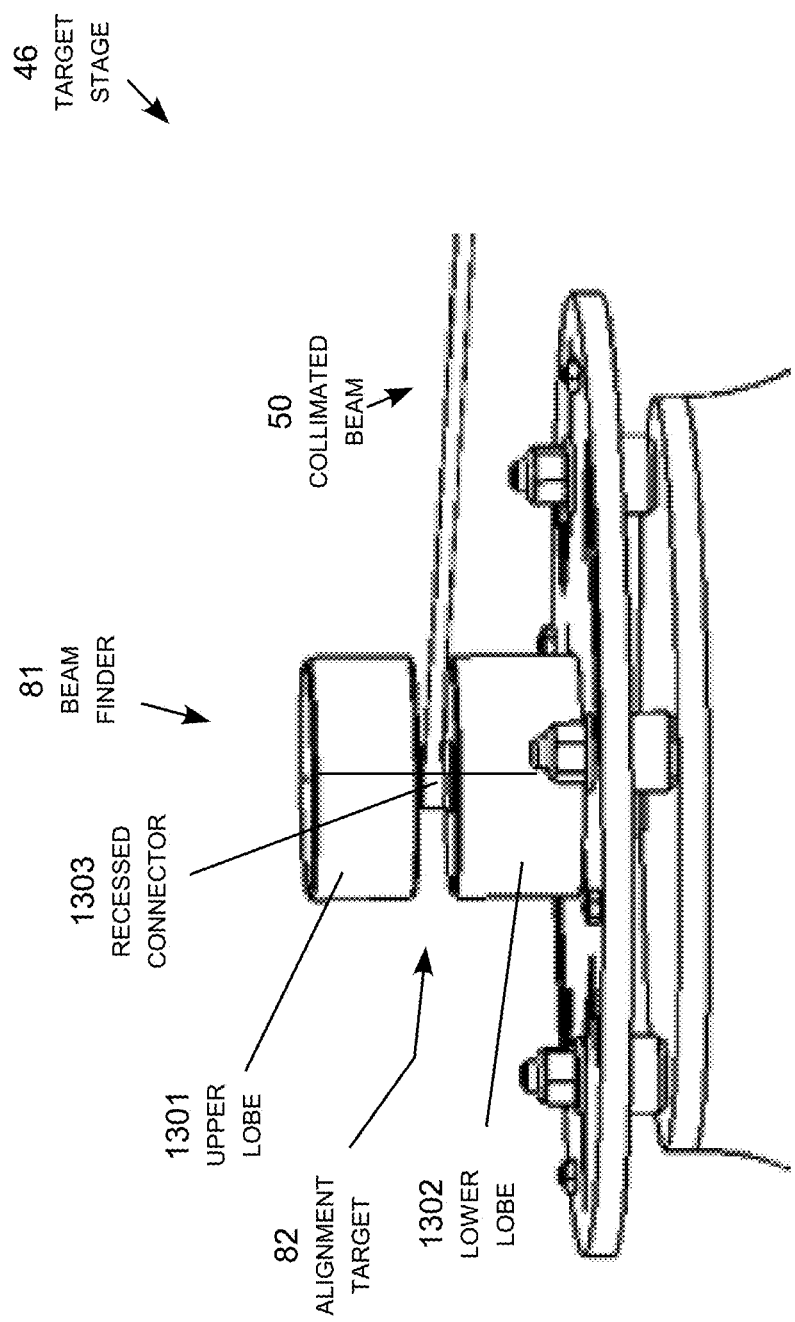
Figure 13C:
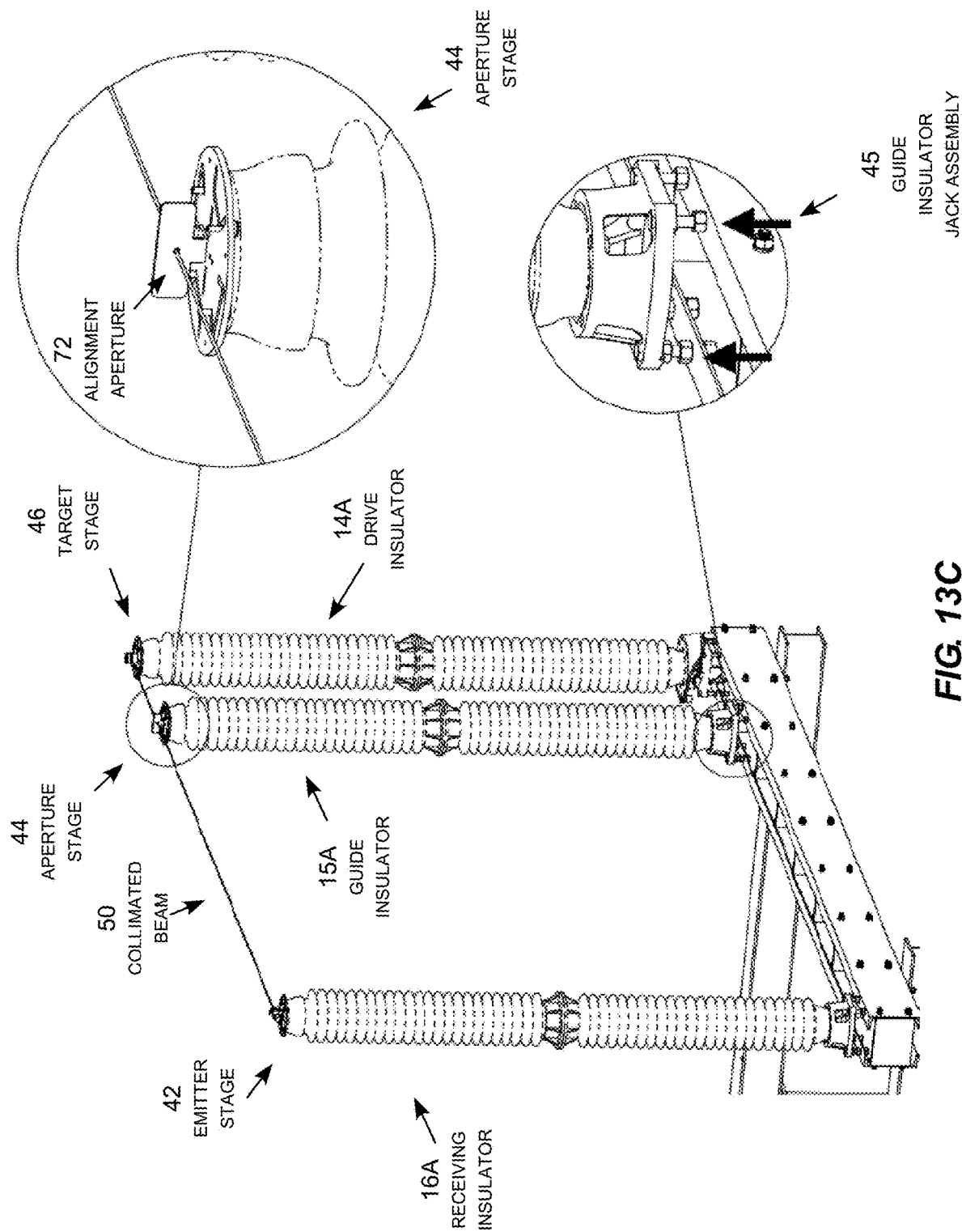
Figure 13D:
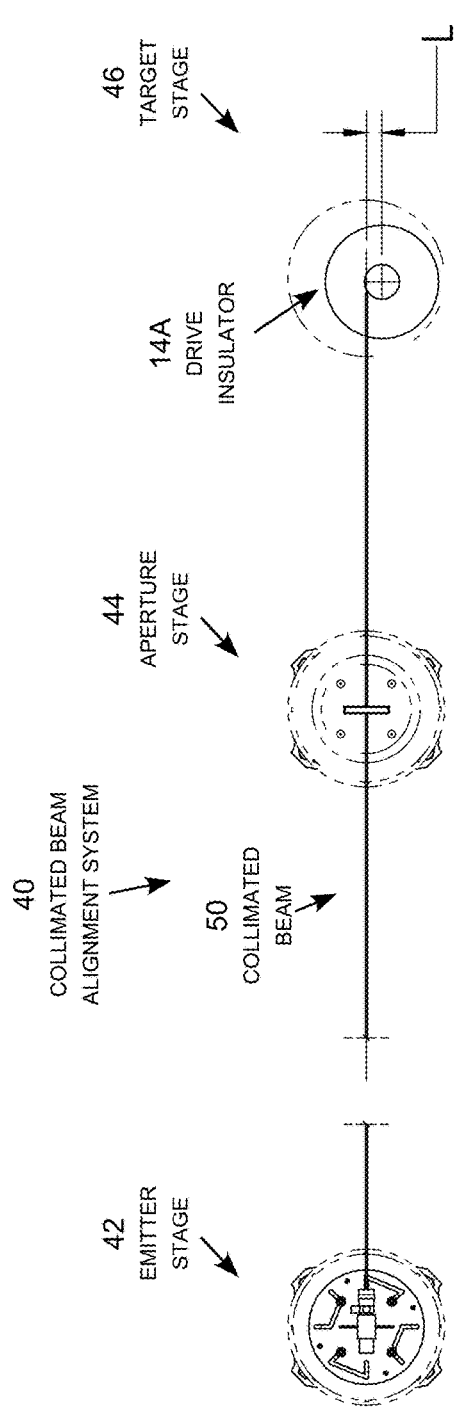
Figure 13E:
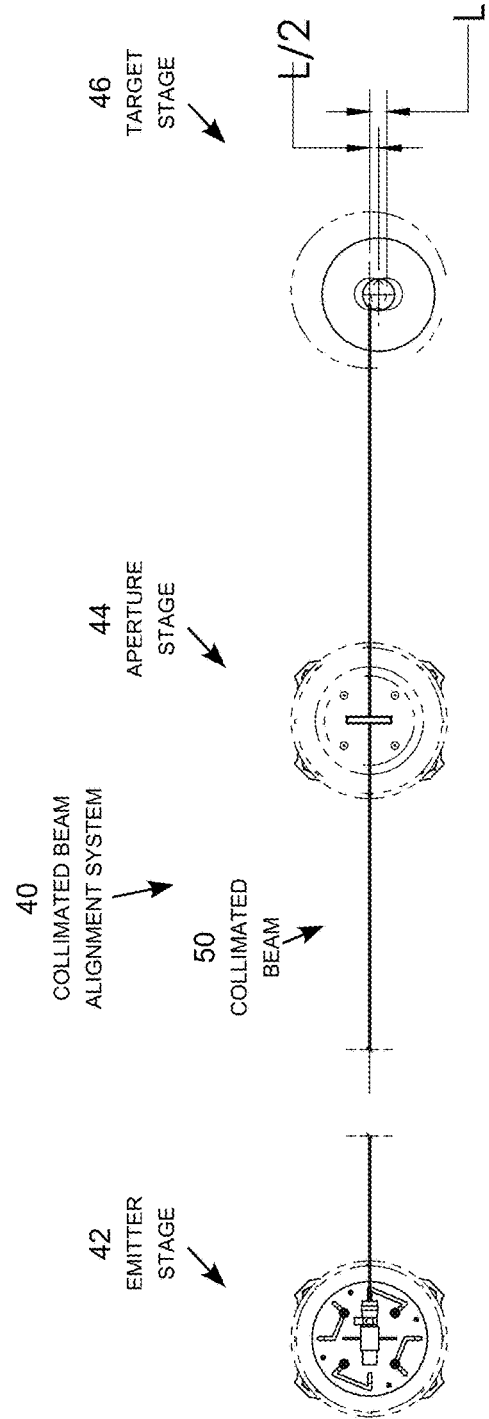

FIG. 13A-13E illustrate an insulator alignment procedure using the collimated beam alignment system 40. Using a level, the technician installs the insulators 14A, 15A and 16A perpendicular to the frame 13A. As shown in FIG. 13A, the technician initially positions the emitter stage 42 on the receiving insulator 14A and the target state 46 on the receiving 16A, without installing the aperture stage 44 on the guide insulator 15A. As shown in FIG. 13B, with the drive insulator 14A rotated to the switch-closed position, the technician uses the directions beam controls 68, 69 (see FIG. 8) to cause the collimated beam 50 to illuminate the alignment target 82. To assist in this process, the target stage 46 includes a dumbbell shaped beam finder 81 with upper and lower lobes 1301, 1302 separated by a recessed connecter 1303, which serves as the alignment target 82. As the lobes 1301, 1302 are much larger than the recessed connector 1303, the lobes are easier to locate with the collimated beam 50. Once the collimated beam 50 is striking one of the lobes, the technician can visually track the beam on the beam finder as while adjusting the pointing direction of the beam until it illuminates the alignment target 82.

As shown in FIG. 13C, once the collimated beam 50 is illuminating the alignment target 82, the technician positions the aperture stage on top of the guide insulator and adjusts the guide insulator jack assembly 45 until the collimated beam passes through the alignment aperture (see FIG. 11). At this point, the insulators 14A, 15A and 16A are properly aligned for the switch-closed position (i.e. closed stop position). As shown in FIG. 13D the technician then checks the wobble of the drive insulator 14A by rotating the drive insulator to the switch-open position (i.e., open stop position) and measures the wobble offset "L".

Referring also to FIG. 12, If the wobble offset is less than a first predefined threshold, such as ¼-inch, the technician may consider the alignment complete. Alternatively, the technician may adjust the set screw assembly 124 of the drive insulator jack assembly 47 to bring the alignment target 82 into alignment with the collimated beam 50 with the drive insulator 14A in the switch-open position. If the wobble offset is greater than the first predefined threshold but less then a second predetermined threshold, such as ¾-inch, the technician adjusts the set screw assembly 124 of the drive insulator jack assembly 47 to offset half the wobble offset "L:/2". If the wobble offset is greater than the second predefined threshold, the technician installs one or more shims 125 to offset the wobble and repeats the preceding procedure until the wobble offset is less than the second predefined threshold.

Once the insulators 14A, 15A and 16A are aligned, the alignment system is removed and the live components of the disconnect switch are attaches to the insulators achieving the desired switch operation illustrated in FIGS. 2A-2C.

The drawings are in simplified form and are not to precise scale unless specifically indicated. The words "couple" and similar terms do not necessarily denote direct and immediate connections, but also include connections through intermediate elements or devices. Certain descriptors, such "first" and "second," "top and bottom," "upper" and "lower," "inner" and "outer," or similar relative terms may be employed to differentiate structures from each other. These descriptors are utilized as a matter of descriptive convenience and are not employed to implicitly limit the invention to any particular position or orientation. It will also be understood that specific embodiments may include a variety of features and options in different combinations, as may be desired by different users. Practicing the invention does not require utilization of all, or any particular combination, of these specific features or options.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

The invention claimed is:

1. A collimated beam alignment system for aligning a first insulator, a second insulator and a third insulator of an electric power disconnect switch, comprising:
   an emitter stage configured to attached to and removable from the first insulator; an aperture stage configured to attached to and removable from the first insulator the second insulator comprising an alignment aperture; a target stage configured to attached to and removable from the first insulator the third insulator comprising an alignment target;
   wherein, with one of the insulators rotated to a switch-closed position, proper alignment of the first, second and third insulators is indicated by a visible spectrum collimated beam from the emitter stage passing through the alignment aperture and illuminating the alignment target.

2. The collimated beam alignment system of claim 1, wherein the visible spectrum collimated beam is a laser beam.

3. The collimated beam alignment system of claim 1, wherein the first insulator is a receiving insulator, the second insulator is a guide insulator, and the third insulator is a drive insulator.

4. The collimated beam alignment system of claim 3, wherein the emitter stage further comprises a plurality of studs sized and positioned to fit into respective bolt holes on a top side of the receiving insulator, and the bolt holes are configured to receive bolts for attaching a jaws of the electric power disconnect switch to the top side of the receiving insulator after the emitter stage has been removed from temporary attachment to the top side of the receiving insulator.

5. The collimated beam alignment system of claim 4, wherein the emitter stage further comprises a base plate comprising a plurality of direction adjustment slots for selectively altering positioning of the studs on the base plate to alter orientation of the emitter stage with respect to the receiving insulator.

6. The collimated beam alignment system of claim 3, wherein the aperture stage further comprises a plurality of studs sized and positioned to fit into respective bolt holes on a top side of the guide insulator, and the bolt holes are configured to receive bolts for attaching a linkage of the electric power disconnect switch to the top side of the guide insulator after the aperture stage has been removed from temporary attachment to the top side of the guide insulator.

7. The collimated beam alignment system of claim 6, wherein the aperture stage further comprises a base plate comprising a plurality of direction adjustment slots for selectively altering positioning of the studs on the base plate to alter orientation of the aperture stage with respect to the guide insulator.

8. The collimated beam alignment system of claim 3, wherein the target stage further comprises a plurality of studs sized and positioned to fit into respective bolt holes on a top side of the drive insulator, and the bolt holes are configured to receive bolts for attaching a linkage of the electric power disconnect switch to the top side of the drive insulator after the target stage has been removed from temporary attachment to the top side of the drive insulator.

9. The collimated beam alignment system of claim 8, wherein the target stage further comprises a base plate comprising a plurality of direction adjustment slots for selectively altering positioning of the studs on the base plate to alter orientation of the target stage with respect to the receiving insulator.

10. The collimated beam alignment system of claim 3, wherein the target stage comprises a dumbbell shaped beam finder comprising upper and lower lobes and the alignment target is positioned on a recessed connecter between the upper and lower lobes.

11. The collimated beam alignment system of claim 3, wherein:
   the emitter stage is temporarily attached to the receiving insulator by one or more magnets;
   an aperture stage is temporarily attached to the receiving insulator by one or more magnets;
   a target stage is temporarily attached to the drive insulator by one or more magnets.

12. The collimated beam alignment system of claim 3, wherein:
   the emitter stage comprises a collimated beam emitter generating the collimated beam attached to a first instance of a universal magnetic bracket;
   the aperture stage comprises an aperture plate comprising the alignment aperture attached to a second instance of a universal magnetic bracket;
   the target stage comprises a beam finder comprising the alignment target attached to a third instance of a universal magnetic bracket.

* * * * *